(12) United States Patent
Pickens, III

(10) Patent No.: US 6,758,391 B1
(45) Date of Patent: Jul. 6, 2004

(54) INTERNET ACCESS OF GOODS AND SERVICES USING GRAPHICAL CODES

(75) Inventor: Thomas Boone Pickens, III, Charleston, SC (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 08/972,313

(22) Filed: Nov. 18, 1997

(51) Int. Cl.[7] .............................................. G06F 17/00
(52) U.S. Cl. ...................................................... 235/375
(58) Field of Search ........................................ 235/375

(56) References Cited

U.S. PATENT DOCUMENTS

| | | | | |
|---|---|---|---|---|
| 3,513,320 | A | 5/1970 | Weldon | 250/219 |
| 4,488,679 | A | 12/1984 | Bockholt et al. | 235/469 |
| 4,654,718 | A | 3/1987 | Sueyoshi | 358/257 |
| 4,752,675 | A | 6/1988 | Zetmeir | 235/375 |
| 4,896,029 | A | 1/1990 | Chandler et al. | 235/494 |
| 4,958,064 | A | 9/1990 | Kirkpatrick | 235/375 |
| 4,998,010 | A | 3/1991 | Chandler et al. | 235/494 |
| 5,047,614 | A | 9/1991 | Bianco | 235/385 |
| 5,153,418 | A | 10/1992 | Batterman et al. | 235/494 |
| 5,189,292 | A | 2/1993 | Batterman et al. | 235/494 |
| 5,223,701 | A | 6/1993 | Batterman et al. | 235/494 |
| 5,343,028 | A | 8/1994 | Figarella et al. | 235/462 |
| 5,352,878 | A | 10/1994 | Smith et al. | 235/462 |
| 5,412,196 | A | 5/1995 | Surka | 235/462 |
| 5,428,211 | A | 6/1995 | Zheng et al. | 235/462 |
| 5,438,188 | A | 8/1995 | Surka | 235/462 |
| 5,465,291 | A | 11/1995 | Barrus et al. | 379/67 |
| 5,478,999 | A | 12/1995 | Figarella et al. | 235/462 |
| 5,483,052 | A | 1/1996 | Smith, III et al. | 235/472 |
| 5,493,105 | A | 2/1996 | Desai | 235/375 |
| 5,545,878 | A | 8/1996 | Jasper, II et al. | 235/462 |
| 5,604,640 | A | 2/1997 | Zipf et al. | 359/803 |
| 5,612,527 | A | 3/1997 | Ovadia | 235/383 |
| 5,640,193 | A | * 6/1997 | Wellner | 348/7 |
| 5,804,803 | A | * 9/1998 | Cragun et al. | 235/375 |
| 5,869,819 | A | * 2/1999 | Knowles et al. | 235/375 |
| 5,903,729 | A | * 5/1999 | Reber et al. | 395/200.49 |
| 5,905,248 | A | 5/1999 | Russell et al. | 235/462 |
| 5,905,251 | A | 5/1999 | Knowles | 235/472.01 |
| 5,933,829 | A | 8/1999 | Durst et al. | 707/10 |
| 5,978,773 | A | 11/1999 | Hudetz et al. | 705/23 |

OTHER PUBLICATIONS

Omniplanar Corporation, "Minicode" May 17, 1999, from the Internet, http://www.omiplanar.com/minicode.html, pp. 1–10.*

File wrapper and print out of PALM system as accessed over PTOnet using Netscape Navigator (TM), May 19, 1999, from the USPTO computer system.*

Benjamin Nelson, "Punched Cards to Bar Codes" 1997, Helmers Publishing, pp. 183, 201, 203, 239, 249, 261, 271, 276, 279, 306, 344, 363, and 371.*

* cited by examiner

*Primary Examiner*—Mark Tremblay
(74) *Attorney, Agent, or Firm*—Madson & Metcalf

(57) ABSTRACT

An optical scanning system and method for scanning graphical codes on an object or media to obtain the Internet address that is represented by the graphical code. An Internet address is graphically encoded and is displayed on an object. The codes are then disseminated to the public, where users see the codes graphically encoded on objects or in media purchased or viewed by the public. Once the user determines that more information is desired, the user elects which option for code scanning is desired: automatic access to the Internet address represented by the graphical code, automatic storage of the Internet address represented by the graphical code into memory or automatic insertion of the Internet address represented by the graphical code into a query of a Web browser. The graphical code is then scanned by an optical scanner. The scanned graphical code is then transmitted to a computer where the graphical code is processed and the encoded Internet address is obtained. Once the encoded Internet address is identified, the elected option is then automatically executed and the Internet site is accessed.

16 Claims, 7 Drawing Sheets

101

111

INTERNET ACCESS OF GOODS AND SERVICES USING GRAPHICAL CODES

FIELD OF THE INVENTION

This invention relates generally to the displaying and scanning of graphical codes on objects to provide Internet access. More particularly, the present invention is a system where a graphical code is displayed on or in some communications media (such as a magazine or television) for scanning by a user to obtain present or future Internet access to the Internet address represented by the graphical code.

BACKGROUND OF THE INVENTION

Supermarkets and department stores have been using bar code scanning systems for years for identification and inventory purposes. Almost every product in a store has it's own unique bar code on the product's packaging. The use of bar codes is no longer limited to just providing the price of an item. For instance, U.S. Pat. No. 5,612,527 to Ovadia, relates to a coupon redemption system, where a bar code contains not only information about the amount of the discount and the expiration date of the coupon, but also the address of the consumer who received the coupon in the mail. By including the address of the coupon user, the purchasing habits of the shopper can be tracked.

The use of bar codes has expanded into other markets as well. For example, U.S. Pat. No. 5,465,291 to Barrus et al, discloses bar codes for placing purchase orders from remote locations, where a purchase order is created by scanning bar codes and transmitting the purchase order to a remote location using a modem or a touch tone phone. SImilarly, U.S. Pat. No. 5,047,614 to Bianco, relates to computer aided shopping. Here, a user creates a purchase order by scanning bar codes from items such as containers, coupons, advertisements or pamphlets which are furnished by a store. The purchase order can then be transmitted to the store or warehouse.

Non-consumer uses have also been developed. For example, U.S. Pat. No. 5,604,640 to Zipf et al., relates to a business card scanner, wherein relevant information such as telephone numbers, fax numbers and addresses are stored on a business card using bar codes. The stored information can then be scanned to provide data information to the user or to produce a database.

The demand to store more data has also increased. In order to encode more information, bar codes have expanded in both the x and in the y directions, thereby increasing the size of the bar codes. However, by increasing the size of the bar code on an object or media, there is less room on the object or media for other pertinent information.

Other means to increase the amount of encoded data have also been exploited. One alternate form for encoding data is set forth in U.S. Pat. No. 5,483,052 to Smith, III et al., which discloses a system capable of reading, storing and using data from a business card or other printed material having high density bar-encoded data. Similarly, U.S. Pat. No. 5,493,105 to Desai discloses an electronic business card system to either read or store data on an electronic strip located on an electronic business card. The electronic business card system can also include a telephone interface wherein the system can call preselected numbers. Similarly, U.S. Pat. No. 5,153,418 to Batterman et al., claims multiple resolution machine readable symbols, where high and low resolution data is encoded in a graphical code. Additionally, U.S. Pat. No. 5,223,701 to Batterman et al. claims a system process and apparatus using multiple resolution machine readable symbols. This system encodes high and low resolution data in a graphical code.

With Internet addresses a key means of marketing and communications, as well as longer Internet addresses and the number of data encoded applications rising, the need for the ability of graphical codes to depict or represent more information also increases. Thus there is not only a demand for the increased ability of graphical codes to depict or represent more information but there is also a demand for an encoding system where the Internet address and other additional information can be encoded in a small, durable and flexible graphical code without occupying a significant area of the media on which it is printed or displayed.

A need therefore exists for graphical codes that can be printed on an object and eventually scanned to provide the Internet address represented by the graphical code.

SUMMARY OF THE INVENTION

It is therefore an object of the present invention to provide Internet access to an Internet address represented by a graphical code by scanning that graphical code.

A further object of the present invention is to store the Internet address represented by the graphical code after scanning the graphical code.

A further object of the present invention is to directly input the Internet address represented by the graphical code into a query of a Web browser.

A further object of the present invention is to scan the graphical code from a physical three dimensional object as a means to access the Internet address represented by the graphical code.

A further object of the present invention is to scan the graphical code from printed media as a means to access the Internet address represented by the graphical code.

A further object of the present invention is to scan the graphical code from a credit card as a means to access the Internet address represented by the graphical code.

A further object of the present invention is to scan the graphical code from a video monitor as a means to access the Internet address represented by the graphical code.

A further object of the present invention is to generate statistics from users who access the Internet address from scanning the graphical code.

A further object of the present invention is to generate marketing statistics from users who access the Internet from scanning the graphical code.

A further object of the present invention is to limit the size of the graphical code to the size of a line of text.

The present invention is a system that allows a user to obtain Internet addresses and to access those addresses by scanning a graphical code on an object or displayed on a monitor. The present invention uses a scanner connected to a computer to scan a graphical code to obtain the Internet address represented by the graphical code. Once the information is captured by the scanner three options are provided: i) automatic access to the Internet address represented by the graphical code, ii) automatic storage of the Internet address represented by the graphical code in the memory of a computer or scanner for later access or iii) automatic input of the Internet address represented by the graphical code into a query of a Web browser to be accessed via user control.

The process for all three options is similar: a person elects an option, then scans the graphical code with a scanner, the scanner reads the graphical code and generates data from the graphical code, the data is then transmitted to a computer where depending on the option selected, the computer automatically executes the elected option. The computer will automatically access to the Internet address represented by the graphical code, store the Internet address or input the Internet address into a query of a Web browser.

DETAILED DESCRIPTION OF THE INVENTION

U.S. Pat. No. 5,153,418 to Batterman et al., Multiple Resolution Machine Readable Symbols and U.S. Pat. No. 5,223,701 to Batterman et al., System Method and Apparatus Using Multiple Resolution Machine Readable Symbols are herein incorporated by reference.

For purposes of this specification "object" shall mean any or all of these media where a graphical code can be seen by a user and scanned by the scanner of the present invention; "graphical code" shall mean any and all graphical codes, incorporating bar codes and the graphical codes as described in U.S. Pat. No. 5,153,418 to Batterman et al.

Figure 1A:
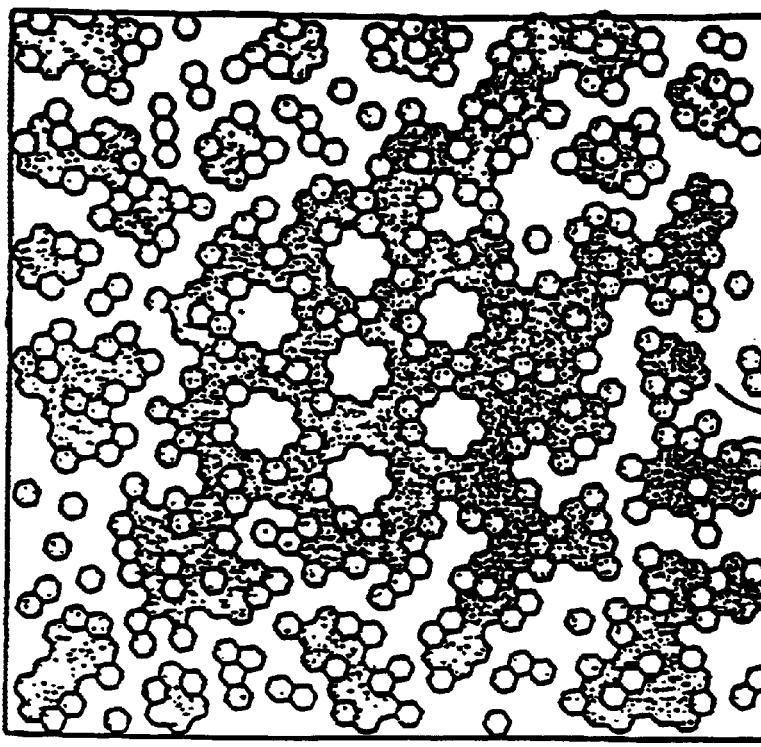
FIG. 1a shows a multiple resolution graphical code.

Referring to FIG. 1a, a multiple resolution graphical code 101 is shown. The graphical code includes both low resolution encoded data cells 12 and high resolution encoded data cells.

Figure 1B:
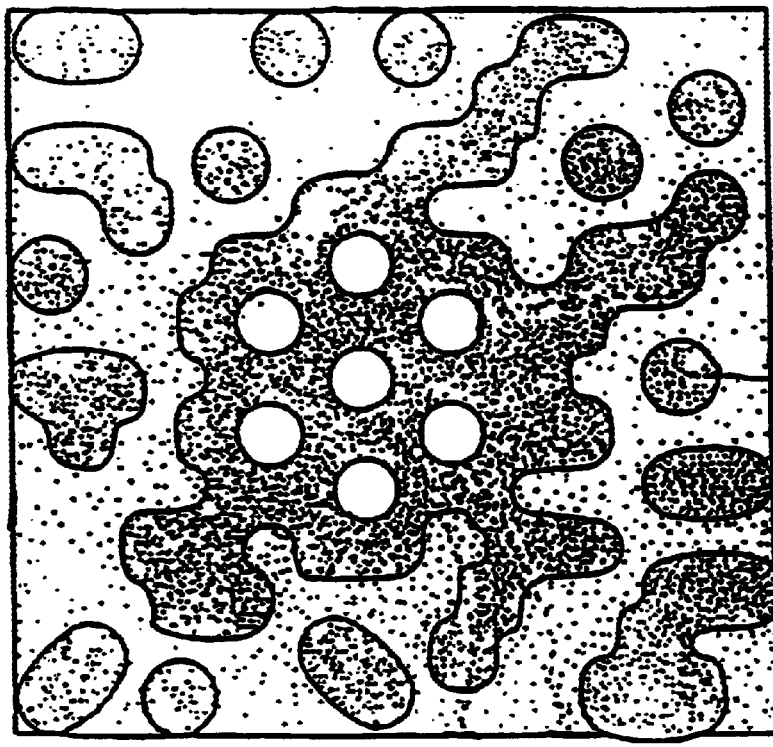
FIG. 1b shows a multiple resolution graphical code viewed at low resolution.

Referring to FIG. 1b, a multiple resolution graphical code 111 is shown. The graphical code is viewed at low resolution showing low resolution data cell 113. The graphical code can be displayed onto almost any object or media. Displaying a graphical code includes printing the graphical code onto an object or displaying the graphical code on a video monitor. The objects can include any physical three dimensional object, video monitor, printed media, printed materials, letters, documents, promotional materials, credit cards, business cards, magazine articles or advertisements, newspaper articles or advertisements, newsletters, catalogs or the like. A user simply scans the graphical code of an object to obtain the Internet address represented by the graphical code. The user can use any commercially available scanner capable of reading graphical codes. Since the storage capability of graphical codes is greater than the storage capacity of a bar code, the Internet address represented by the graphical code can be one of many different items of data encoded in one graphical code. For instance, a graphical code can include the Internet address, street address and telephone number. In addition, the graphical code can be single, two or multi-dimensional to provide additional information. An object can also include more than one graphical code to provide additional information.

The graphical code can include additional information relating to the object's origin, the equipment used to manufacture the object, the location of the equipment used to print the graphical code, the equipment used to print the graphical code, mailing address of the recipient of the object containing the graphical code, where an item was purchased, or the type of object the graphical code was printed or displayed upon. By scanning the graphical code and connecting to the Internet address that the graphical code represents, the represented graphical code owner can use the number of "hits", i.e., the number of times someone contacts the Internet address that the graphical code represents, to compile statistics. The statistics can then be used to provide information such as, marketing demographics or marketing power of the product or object.

Figure 2:
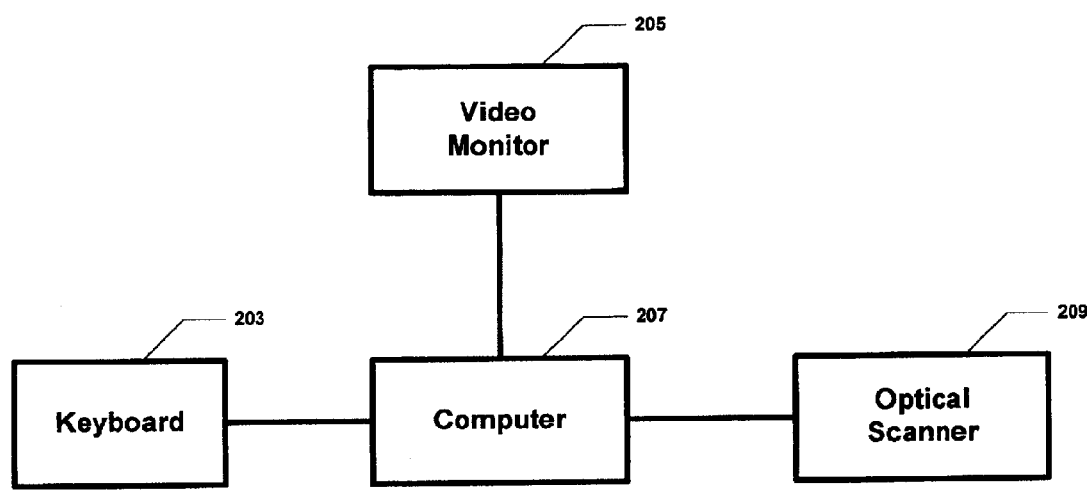
FIG. 2 shows the scanning system.

Referring to FIG. 2, an Internet access system 201 for scanning graphical codes is shown. The optical scanning system 201 includes computer 207 having memory and a processor, monitor 205, optical scanner 209 and keyboard 203. An object having a graphical code with an encoded Internet address is scanned by optical scanner 209, the scanned data is then transmitted to computer 207 where the data is processed to identify the encoded Internet address.

Once the Internet address is identified, there are three different options available depending on where the user inputs the scanned data from the graphical code: (i) direct access to the Internet address represented by the graphical code, (ii) storing the Internet address represented by the graphical code in the memory of the computer or scanner or (iii) inputting the Internet address represented by the graphical code into a query of the user's Web browser to be accessed via user control. Identifying the encoded Internet address includes decoding the graphical code into a format the computer can implement for additional uses. All three options work in a similar manner.

Figure 3A:
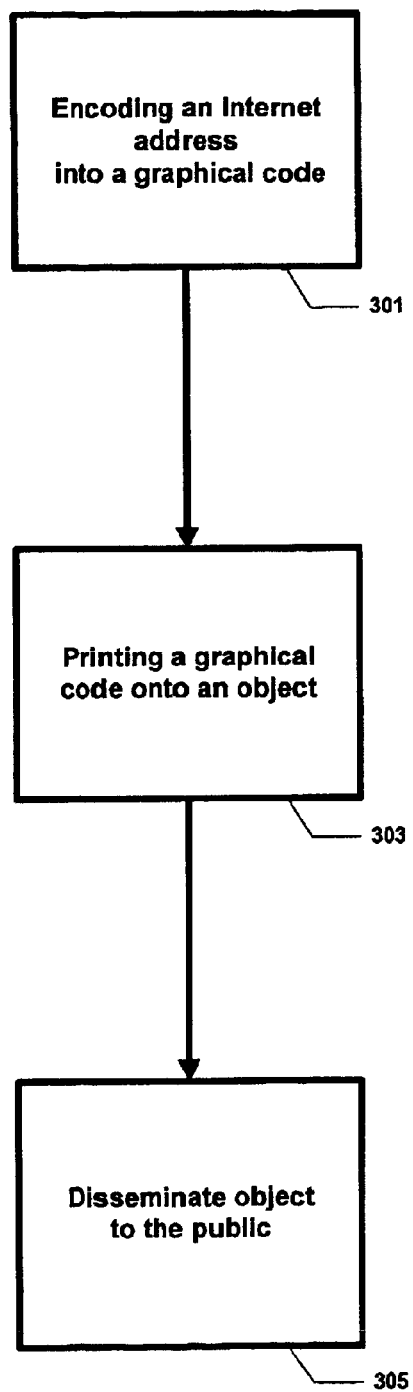
FIG. 3a shows the steps of providing the public with graphically encoded objects.

Referring to FIG. 3A, the steps of providing the public with graphically encoded objects is shown. The process starts by encoding an Internet address into a graphical code 301. Next, the graphical code is printed onto an object 302 for later access by a user interested in the Internet address represented by the graphical code. The graphically encoded objects are then disseminated to the public 305. In an alternative embodiment, the graphical codes can be displayed on a screen or monitor in conjunction with an advertisement.

The graphical codes can be single, double or multi-dimensional. In the preferred embodiment, the graphical code is two dimensional, and limited in height to a single line of type. The number of dimensions that a graphical code requires is influenced by the amount of data and cost factors. As noted above, the size of the graphical code is limited to the size of one line of text to preserve other space on the media on which the code is displayed. The preferred size of the graphical code can be in the range of about six to twenty (6–20) point type which is equivalent to about 2.12 to 7.06 millimeters. However, in practical terms, there is no limit to the size of the code so long as it fits within the vertical dimension of a single line of type, whatever the type size may be. Since the graphical code can be included in an advertisement or article, the graphical code should not require more space then necessary to allow more space for additional pertinent information.

Figure 3B:
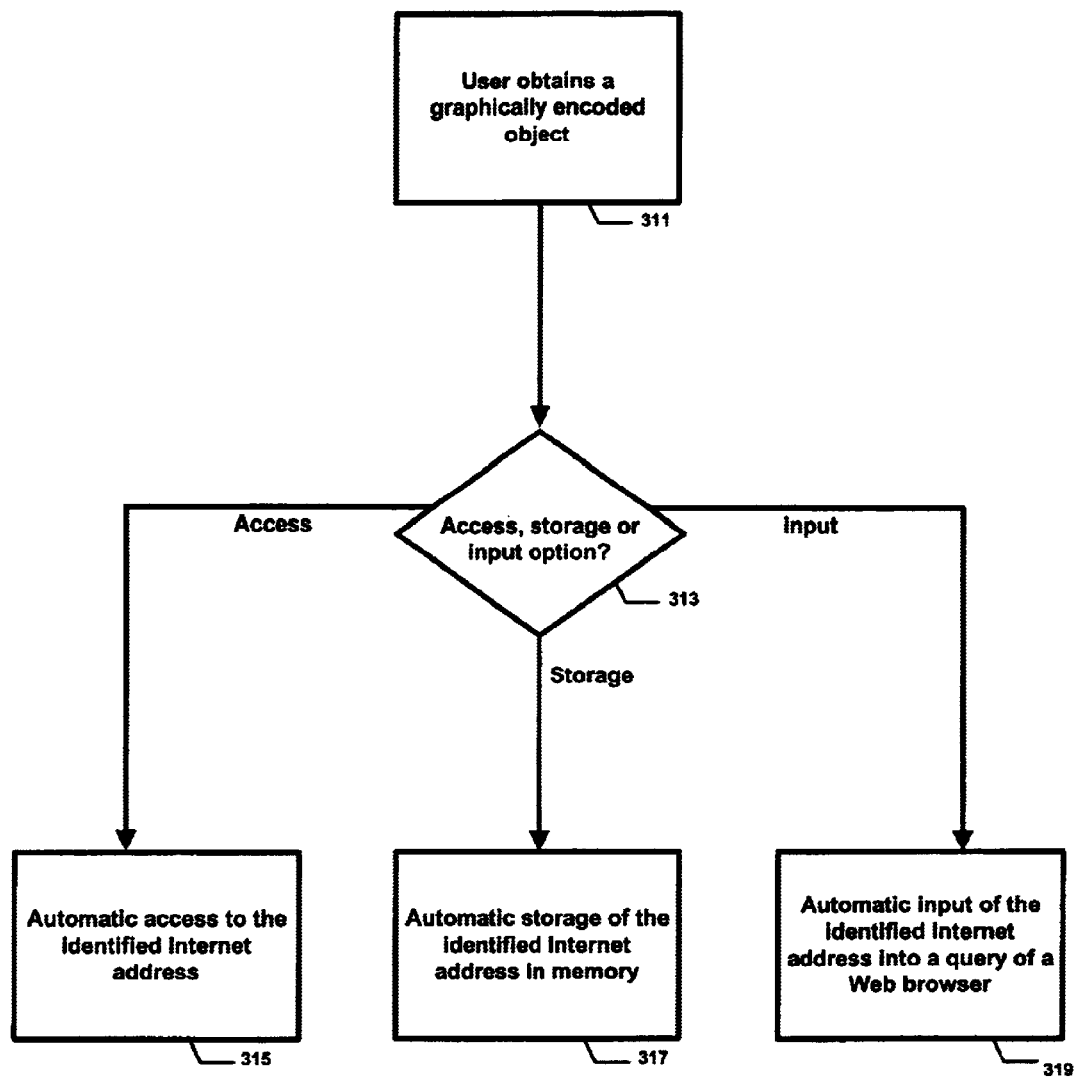
FIG. 3b shows the different options given a user once a graphically encoded object is scanned.

Referring to FIG. 3B, the different options relative to scanning and interpreting graphical codes that are available to a user are shown. First, the user obtains a graphically encoded object 311. Once an object is obtained for scanning, the user needs to choose which option to pursue 313: automatic access to the identified Internet address 315, automatic storage of the identified Internet address 317 or automatic input of the identified Internet address into a query of a Web browser 319.

Figure 4:
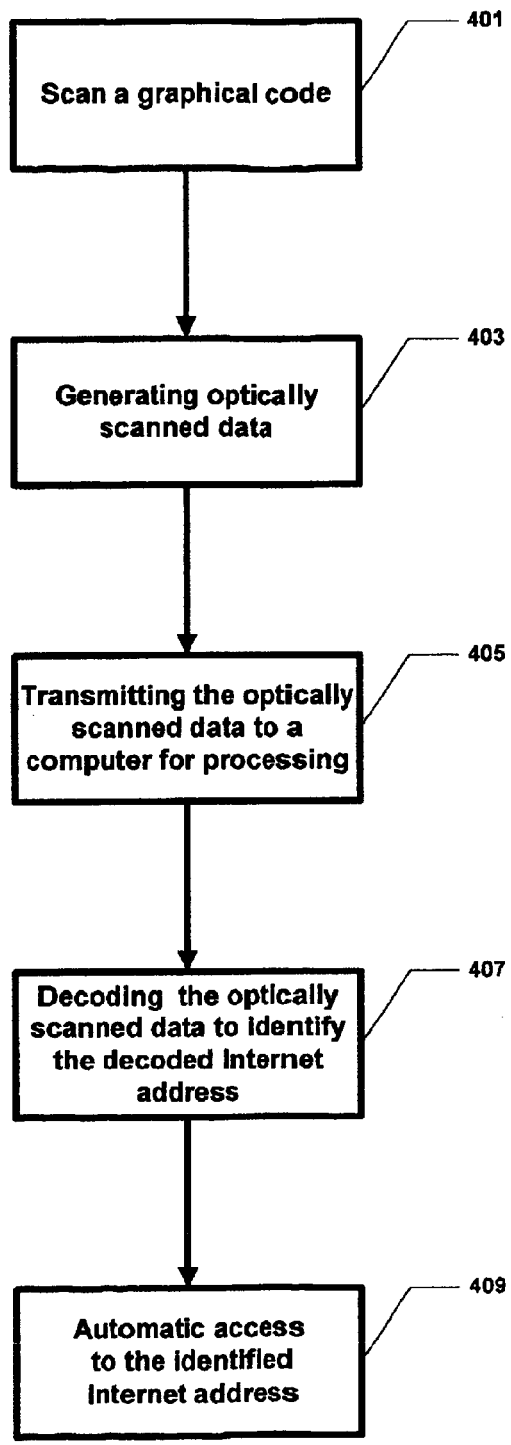
FIG. 4 shows the detailed steps for automatic access to the identified Internet address.

Referring to FIG. 4, the option for automatic access to the Internet address represented by the graphical code is illustrated. Using a scanner, a user scans a graphical code 401. Next, the scanner reads the graphical code and generates data 403. The optically scanned data is then transmitted to a computer for processing 405. The computer decodes and identifies the Internet address represented by the graphical code 407. The last step is automatic access to the identified Internet address 409 represented by the graphical code. For the last step, the Internet address is automatically entered into a query where the computer automatically accesses the Internet address represented by the graphical code. The connection means typically consists of a modem and software designed to provide access to the Internet.

Figure 5:
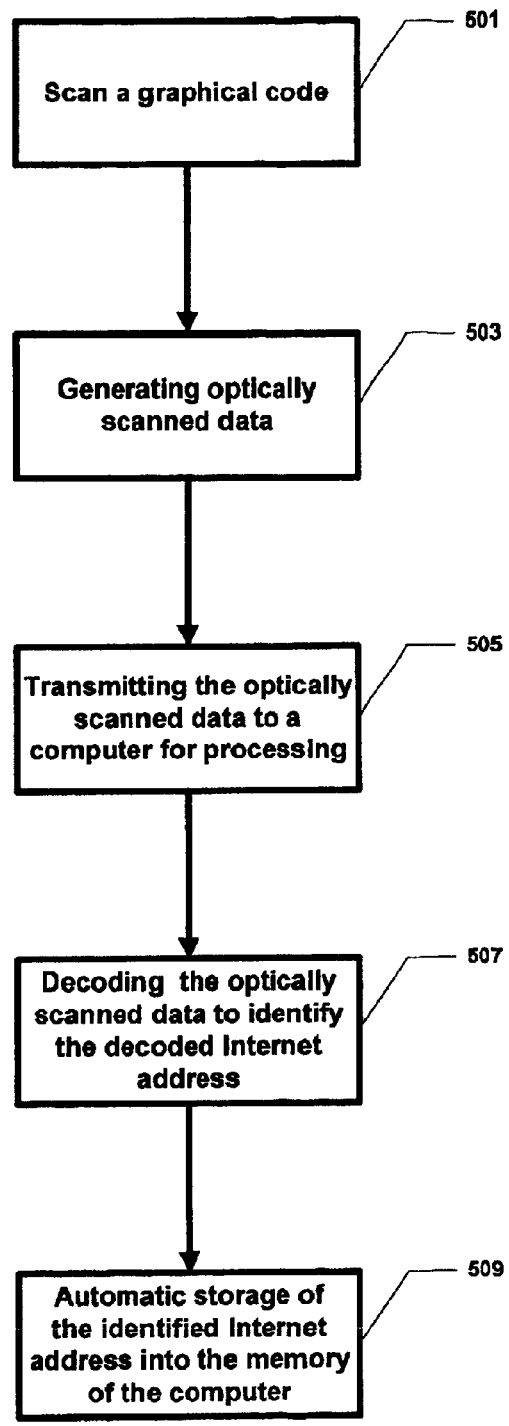
FIG. 5 shows the detailed steps for automatic storage of the identified Internet address into memory.

Referring to FIG. 5, the option for automatic storage of the identified Internet address is illustrated. Using a scanner, a user scans a graphical code 503. Next, the scanner reads the graphical code and generates data 505. The optically scanned data is then transmitted to a computer for processing 507. The computer decodes and identifies the Internet address represented by the graphical code 509. The last step is automatic storage of the identified Internet address into the memory of the computer 511. The data can also be stored into a database or the memory of a Web browser.

In an alternative embodiment, the scanner can include memory. Using the scanner, a user scans a graphical code. The scanner reads the graphical code and generates data. The data can then be stored into the memory of the scanner. At a later time, the scanner can be connected to a computer and the stored data can be transferred to the computer. The transferred data is then processed, where the computer decodes and identifies the Internet address represented by the graphical code. The scanner can store data from multiple scanned graphical codes. In another embodiment, the scanner can also include processing capabilities to decode and identify Internet addresses from graphical codes. As a result, the scanned data can be downloaded to a computer, into the memory of a computer or into a Web browser.

In another embodiment the scanner can be portable, thereby allowing a user to scan multiple graphical codes and download the information to a computer at a later time. In yet another embodiment, the scanner can be an infrared scanner. The use of an infrared scanner provides the user the capability of performing wireless scanning of data with the scanned data being transferred in a real time mode or with the data being stored and being transferred at a later time.

Figure 6:
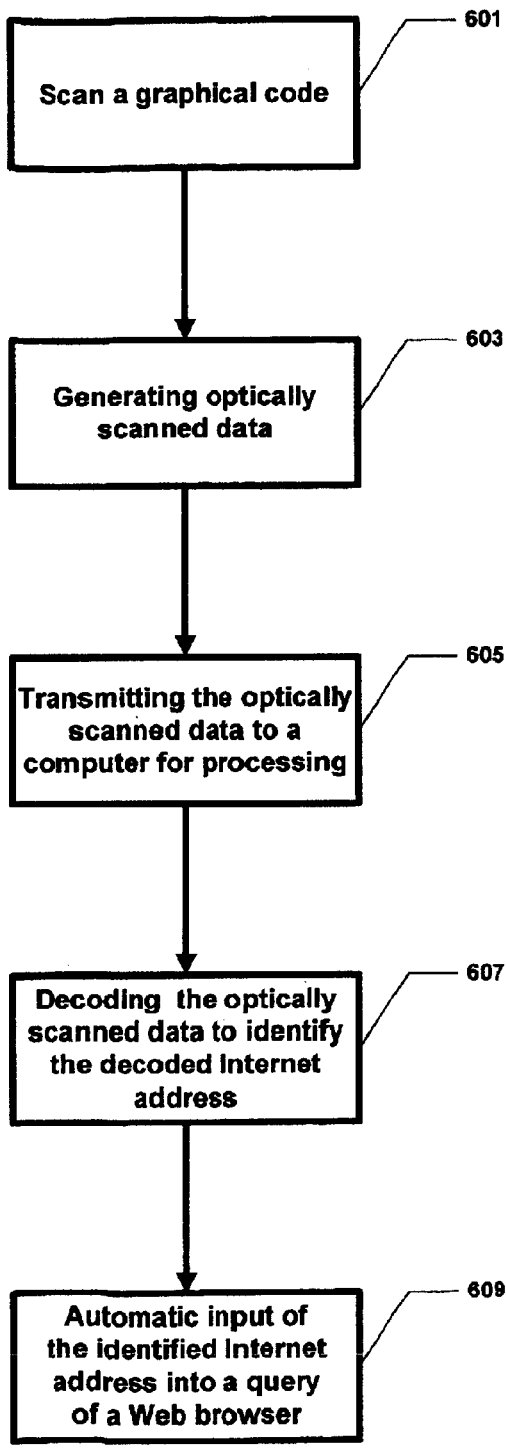
FIG. 6 shows the detailed steps for automatic input of the identified Internet address into a query of a Web browser.

Referring to FIG. 6, the option for automatic input of the identified Internet address into a Web browser's query is illustrated. Using a scanner, a user scans a graphical code 601. Next, the scanner reads the graphical code and generates data 603. The optically scanned data is then transmitted to a computer for processing 605. The computer decodes and identifies the Internet address represented by the graphical code 607. The last step is automatic input of the identified Internet address into a query of a Web browser, where the user is prompted to access, store or delete the identified Internet address 609.

How to Use

The following are examples of how the graphical codes can be implemented. A user is drinking a soda with an advertisement for a contest on the soda can, the user simply scans the graphical code on the can to obtain access to the soda manufacturer's Internet site. Once at the Internet site, the user can obtain more details on the product and the contest. If the user can already be logged on the Internet and wants to look at the Internet site but at a later time, the user simply scans the graphical code and stores the Internet address into the memory of the computer. The user can also scan the graphical code and have the Internet address automatically entered into a query of the user's Web browser, where the user has the option of choosing to access the Internet site, store the Internet address or to delete the Internet address.

A user can also access the Internet site of a company that advertises in a magazine. Presently, a large number of magazines have advertiser cards in a magazine where a reader selects the products about which the user would like to obtain additional information mails the card to the magazine. The magazine then informs the advertiser which then sends the selected literature to the reader. Instead the Internet addresses of the advertisers can be graphically encoded into the advertisements, together with information identifying the media carrying the code. The user scans the graphical codes and accesses the Internet addresses represented by the graphical code. The user obtains the product information in a quicker and more efficient manner.

The graphical code can also include information to help the manufacturer to determine the effectiveness of their advertisements. When the graphical code is scanned, the scanned data can also include information such as what type of object the graphical code was printed or where the consumer purchased the object, etc. The scanned data can be also be transferred to the Internet address site when the user accesses the Internet site. By knowing what advertisement, or object, the user scanned the data from, the manufacturer can determine the effectiveness of their advertisements. By knowing where the user purchased the object containing the graphical code, the manufacturer can also determine the effectiveness of its distributors. The additional information that a manufacturer can obtain from the scanned graphical codes can provide very effective marketing information about their products or advertisements.

Although the apparatus and process of the present invention have been described in detail for purpose of illustration, it is understood that such detail is solely for that purpose, and variations can be made therein by those skilled in the art without departing from the spirit and scope of the invention. The apparatus and process of the present invention is defined by the following claims.

What is claimed is:

1. An optical scanning system, comprising:
   an object;
   a two dimensional graphical code displayed on the object, wherein the graphical code comprises an encoded Internet address and additional information that is separate from the Internet address and that comprises a unique characteristic of the object;
   scanning means for optically scanning the graphical code; and
   a computer connected to the scanning means, the computer being configured to decode the scanned encoded Internet address and additional information and automatically send the decoded additional information to the Internet address.

2. The optical scanning system as in claim 1, further comprising communications means for connecting the computer to the identified Internet address.

3. The optical scanning system as in claim 1, where the communications means is a modem.

4. The optical scanning system as in claim 1, where the computer further comprises memory for storing the identified Internet address into the memory of the computer.

5. The optical scanning system as in claim 1, where the scanner further comprises memory for storing the encoded Internet address into the memory of the scanner.

6. The optical scanning system as in claim 5, where the scanner is detachably connected to the computer.

7. The optical scanning system as in claim 5, where the scanner is a wireless infrared scanner.

8. The optical scanning system as in claim 1, further comprising a Web browser having a query, where the identified Internet address is inserted into the query of the Web browser.

9. The optical scanning system as in claim 1, wherein the graphical code is displayed on an object, and wherein the object is selected from the group consisting of the item and a representation of the item.

10. The optical scanning system as in claim 1, where the graphical code is in the range about 2.12 to 7.06 millimeters in size.

11. An optical scanning system, comprising:

an object;

a two dimensional graphical code displayed on the object, the graphical code comprising an encoded Internet address and additional information that is separate from the Internet address and that comprises a unique characteristic of the object;

scanning means for optically scanning the graphical code;

processing means for decoding the scanned encoded Internet address and additional information; and memory for storing the decoded Internet address and additional information.

12. A process for optically scanning graphical codes, comprising:

providing a two dimensional graphical code displayed on an object, wherein the graphical code comprises an encoded Internet address and additional information that is separate from the Internet address and that comprises a unique characteristic of the object;

an individual optically scanning the graphical code to generate optically scanned data;

decoding the scanned encoded Internet address and additional information; and automatically sending the decoded additional information to the Internet address.

13. The process for optically scanning graphical codes as in claim 12, further comprising automatically storing the identified Internet address in the memory of the computer.

14. The process for optically scanning graphical codes as in claim 12, further comprising automatically inserting the identified Internet address into a query of a Web browser in the computer.

15. The process for optically scanning graphical codes as in claim 12, wherein the graphical code is displayed on an object, wherein the object comprises text having a text height, and wherein the graphical code is limited in height to the text height.

16. The process for optically scanning graphical codes as in claim 12, where the graphical code is in the range about 2.12 to 7.06 millimeters in size.

* * * * *